United States Patent [19]

Abe et al.

[11] Patent Number: 4,836,577

[45] Date of Patent: Jun. 6, 1989

[54] AUTOMOBILE SUSPENSION

[75] Inventors: Masaru Abe; Takashi Kohata; Yoshimichi Kawamoto, all of Saitama, Japan

[73] Assignee: Honda Giken Kogyo Kabushiki Kaisha, Tokyo, Japan

[21] Appl. No.: 137,961

[22] Filed: Dec. 24, 1987

[30] Foreign Application Priority Data

Dec. 26, 1986 [JP] Japan .................. 61-314681

[51] Int. Cl.⁴ .................................. B62D 6/02
[52] U.S. Cl. .......................... 280/773; 280/91; 280/660; 280/707
[58] Field of Search ............ 280/707, 708, 771, 772, 280/95 R, 95 A, 93, 94, 773, 91, 660

[56] References Cited

U.S. PATENT DOCUMENTS

| 1,953,742 | 4/1934 | Bunch et al. | 280/773 |
| 2,274,821 | 3/1942 | Bloxsom | 280/773 |
| 2,910,131 | 10/1959 | Krotz | 280/773 |
| 4,687,216 | 8/1987 | Kawamoto | 280/91 |

FOREIGN PATENT DOCUMENTS

| 60-13860 | 1/1985 | Japan . | |
| 60-128080 | 7/1985 | Japan . | |
| 1100689 | 1/1968 | United Kingdom | 280/773 |

Primary Examiner—Richard A. Bertsch
Attorney, Agent, or Firm—Lyon & Lyon

[57] ABSTRACT

An automobile suspension includes a suspension member coupled to a vehicle body, a disc-shaped actuator mechanism detachably supported on the suspension member, and a knuckle having a swingable support shaft swingably supported for swinging movement about a central pivot through which the axis of the disc-shaped actuator mechanism passes, the knuckle being adapted to support a wheel rotatably. The disc-shaped actuator mechanism includes a pair of actuators disposed thereon at respective positions spaced substantially equally from the central pivot and located on at least one straight line passing through the central pivot, the actuators pivotally supporting the knuckle, respectively, for causing the knuckle to be angularly moved about the central pivot.

14 Claims, 5 Drawing Sheets

AUTOMOBILE SUSPENSION

BACKGROUND OF THE INVENTION

1. Field of the Invention

The present invention relates to an automobile suspension, and more particularly to a suspension having an actuator mechanism for adjusting wheel alignment including turning of a wheel.

2. Description of the Relevant Art

Conventional automobile suspensions include steering wheel suspensions as disclosed in Japanese Laid-Open Utility Model Publication No. 60/13860 and Japanese Laid-Open Patent Publication No. 60-128080, for example.

The suspension disclosed in the former publication primarily includes trailing arms, a lateral link, and a rear axle beam supported on a vehicle body by the trailing arms and the lateral link. The suspension further includes knuckles pivotally supported on respective opposite ends of the rear axle beam by means of kingpins, a relay rod extending parallel to and in front of the rear axle beam and operatively interconnecting the knuckle arms of the knuckles on the opposite ends of the rear axle beam, and a steering mechanism disposed parallel to and behind the rear axle beam and comprising a steering actuator and a steering link. The suspension doubles as a rear wheel steering apparatus. More specifically, by actuating the steering mechanism, one of the knuckle arms is angularly moved and the other knuckle arm is simultaneously angularly moved in parallel through the relay rod for turning rear wheels. According to this suspension, the lateral link and the steering link are of the same length and extend parallel to each other.

According to the suspension disclosed in the latter publication, a rear wheel steering system includes an input shaft extending longitudinally of a motor vehicle and having an eccentric shaft on the rear end of the input shaft, and a tubular member having a pinion on its front portion and an eccentric cam on its rear portion is rotatably fitted over the eccentric shaft. The pinion is held in mesh with an internal gear fixed to the vehicle body. A joint member interconnecting and supporting laterally spaced rear wheel tie rods is rotatably fitted over the eccentric cam.

The former suspension is however disadvantageous in that since the steering link and the relay rod are arranged parallel to the axle beam and the lateral link, these members result in an intricate structure, and affect the suspension geometry to the extent that it cannot be determined with large freedom.

The freedom of determining the suspension geometry is large with the latter suspension. However, in the latter suspension, the pinion of the tubular member is held in mesh with the internal gear fixed to the vehicle body, and the tie rods coupled to the knuckle arms are joined to the eccentric cam through joints. Where the suspension is employed to support rear wheels which are not steerable, therefore, not only the tie rods but also support members of the vehicle body have to be modified. The suspension cannot be used compatibly in both an automobile with only front wheels steerable and an automobile with front and rear wheels steerable.

SUMMARY OF THE INVENTION

In view of the aforesaid drawbacks of the conventional suspensions, it is an object of the present invention to provide a suspension which allows suspension geometry to be determined with large freedom and can be used compatibly in different automobile types.

According to the present invention, an automobile suspension includes a suspension member coupled to a vehicle body, a disc-shaped actuator mechanism detachably supported on the suspension member, a knuckle having a swingable support shaft swingably supported for swinging movement about a central pivot through which the axis of the disc-shaped actuator mechanism passes, the knuckle being adapted to support a wheel rotatably, the disc-shaped actuator mechanism including a pair of actuator means disposed thereon at respective positions spaced substantially equally from the central pivot and located on at least one straight line passing through the central pivot, the actuator means pivotally supporting the knuckle, respectively, for causing the knuckle to be angularly moved about the central pivot.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 2:
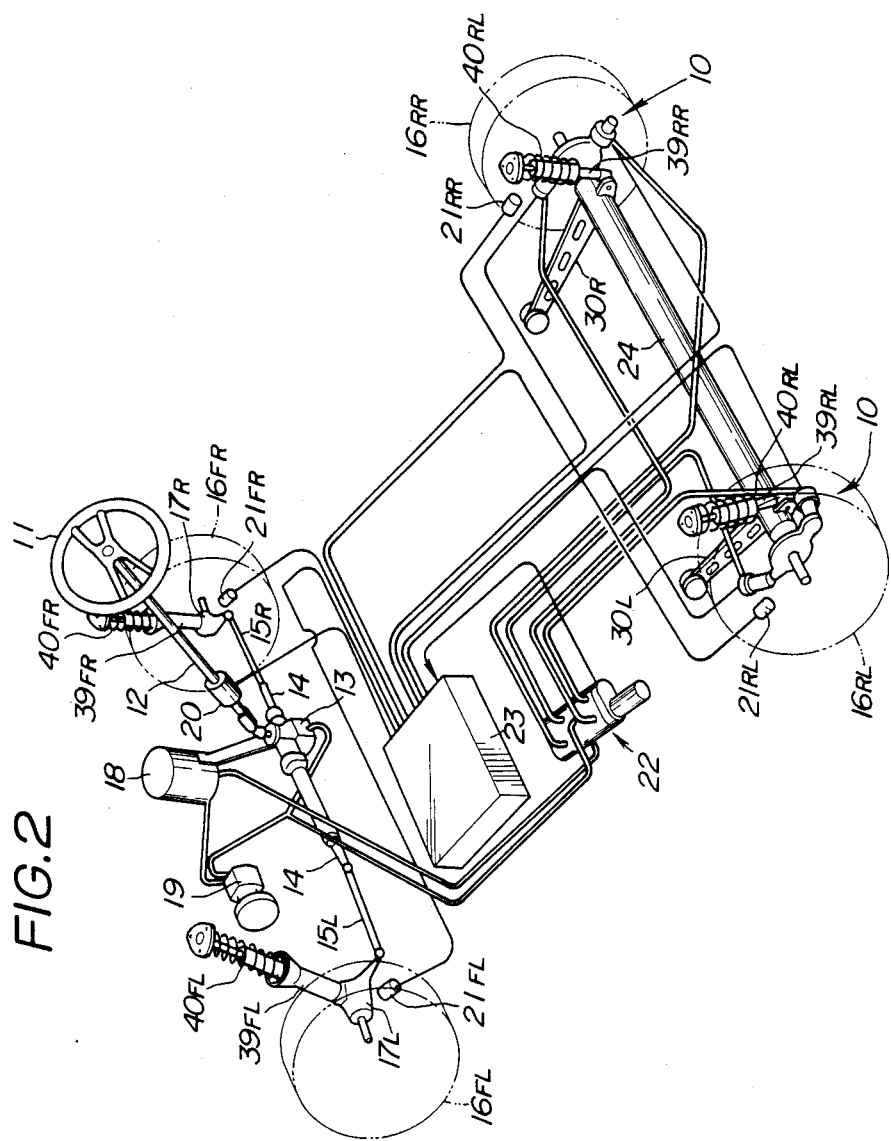
FIG. 2 is a perspective view of an overall system, including a hydraulic piping, of the suspension.

FIG. 2 schematically shows an automobile with steerable front and rear wheels, the automobile incorporating a suspension of the present invention for supporting the rear wheels.

As shown in FIG. 2, a steering wheel 11 is operatively coupled by a steering shaft 12 to a steering gear mechanism of the rack-and-pinion type which is housed in a gear case 13. As is well known, the steering gear mechanism has a pinion rotatable with the steering shaft 12 and a pair of lateral racks 14 meshing with the pinion and projecting from the opposite ends of the gear case 13. The ends of the racks 14 which project out of the gear case 13 are coupled through respective tie rods 15L, 15R to respective knuckle arms 17L, 17R on which front wheels 16FL, 16FR are rotatably supported.

The gear case 13 also accommodates therein a power cylinder for applying hydraulic assistive power to the racks 14 and a control valve for controlling hydraulic pressure to be supplied to the power cylinder. The control valve is connected to a reservoir tank 18 and an oil pump 19 and communicates with working chambers of the power cylinder through a degree of opening dependent on turning motion of the steering wheel 11. The oil pump 19 comprises a double pump or a pump with a flow dividing valve, and has two outlet ports. One of the outlet ports is connected to the control valve, and the other outlet port is connected to a solenoid-operated directional control valve 22 which is coupled to hydraulic actuators 41A, 41B (described later).

The reservoir tank 18, the oil pump 19, and the solenoid-operated directional control valve 22 jointly constitute a hydraulic pressure supply mechanism for supplying controlled hydraulic pressure to the hydraulic actuators 41A, 41B.

A steering angle sensor 20 comprising an encoder or the like for detecting a steering angle is mounted on the steering shaft 12. Vehicle speed sensors 21FL, 21FR are disposed inwardly of the front wheels 16FL, 16FR, respectively. These sensors 20, 21FL, 21FR are electrically connected to a control unit 23 (described later).

The knuckle arms 17L, 17R are supported by respective front wheel shock absorbers 39FL, 39FR combined with respective suspension springs 40FL, 40FR.

A rear axle beam 24 serving as a suspension member supported on the vehicle body is disposed in a rear portion of the vehicle body. The rear axle beam 24 extends transversely of the vehicle body and supports on its opposite ends rear wheels 16RL, 16RR through respective actuator mechanisms 10. Laterally spaced trailing arms 30L, 30R have rear ends coupled to the ends of the rear axle beam 24 inwardly of the actuator mechanisms 10, and front ends pivotally joined to the vehicle body.

Figure 1:
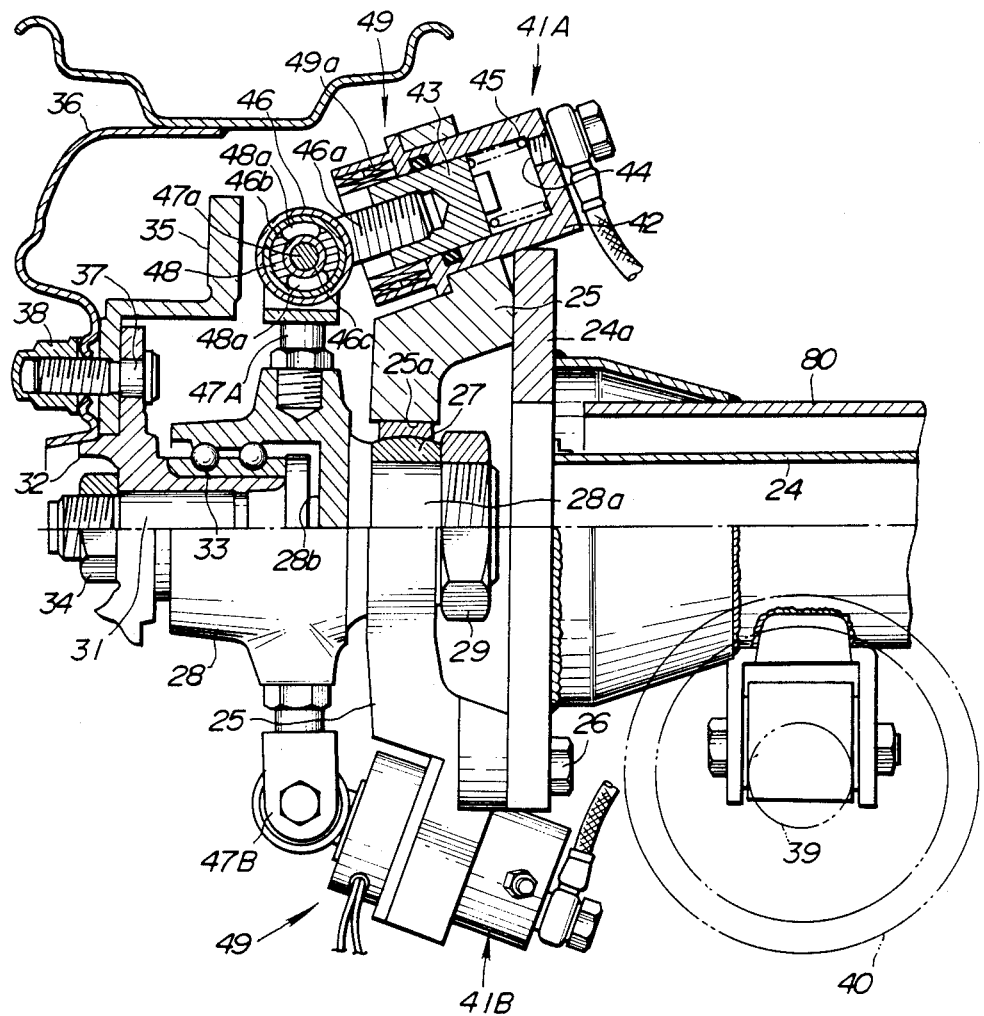
FIG. 1 is a plan view, partly in cross section, of an actuator mechanism of an automobile suspension according to a first embodiment of the present invention.

As shown in FIG. 1, a bearing holder 80 having an integral flange 24a is attached to each end of the rear axle beam 24. A substantially disc-shaped holder plate 25 having an axial central hole 25a defined therein is secured to the flange 24a through a plurality of bolts 26. The holder plate 25 is therefore easily detachable from the flange 24a by removing the bolts 26. A ball joint 27 is fitted in the central hole 25a of the holder plate 25. Through the ball joint 27, there extends a swingable support shaft 28a projecting integrally from a rear wheel knuckle 28 and fastened to the ball joint 27 by means of a nut 29 threaded on the end of the shaft 28a. The knuckle 28 is therefore freely swingable about the center of the central hole 25a of the holder plate 25.

The knuckle 28 has a cavity 28b defined therein and opening outwardly of the vehicle body. A spindle 31 and a hub 32 are rotatably supported in the cavity 28b through a bearing 33, the spindle 31 being inserted through the hub 32. The hub 32 and the spindle 31 are fastened together by means of a nut 34 threaded on the distal end of the spindle 31. To the hub 32, there are joined a brake disc 35 and a wheel 36 by means of bolts 37 and nuts 38.

As shown in FIGS. 1 and 2, the rear wheels 16RL, 16RR are supported by respective shock absorbers 39RL, 39RR associated with respective suspension springs 40RL, 40RR.

As illustrated in FIG. 1, the knuckle 28 is swingably supported on the center of the disc-shaped holder plate 25 by the swingable support shaft 28a and is also pivotally supported by the hydraulic actuators 41A, 41B one on each side of the swingable support shaft 28a. The hydraulic actuators 41A, 41B are connected between the disc-shaped holder plate 25 and the knuckle 28 and disposed at respective two positions on the holder plate 25 which are equally spaced from the center of the central hole 25a of the holder plate 25, i.e., from the pivot where the knuckle 28 is swingably supported, and which are located on a straight array line (parallel to the road surface in the illustrated embodiment) extending longitudinally of the vehicle through the pivot and on which the hydraulic actuators 41A, 41B are situated.

Each of the hydraulic actuators 41A, 41B comprises a cylinder body 42 fitted in the holder plate 25, and a piston 43 slidably disposed in the cylinder body 42 and defining therein a working chamber 44 communicating with the solenoid-operated directional control valve 22. A spring 45 is disposed under compression in the working chamber 44 and between the piston 43 and the inner bottom surface of the cylinder body 42 for normally urging the piston 43.

A joint tubular member 46 is fixed to the head of the piston 43 by a rod 46a threaded coaxially in the piston 43. The joint tubular member 46 has an axis perpendicular to a plane passing through the axis of the disc-shaped holder plate 25 and the array line on which the hydraulic actuators 41A, 41B are located. A double tubular body comprising an outer tube 46b, an inner tube 46c, and a bushing 48 disposed therebetween is force-fitted coaxially in the joint tubular member 46. The bushing 48 is preferably made of an elastomeric material such as rubber.

The knuckle 28 has two joint brackets 47A, 47B positioned near the hydraulic actuators 41A, 41B, respectively, and having rods 47a inserted through the inner tubes 46c of the respective joint tubular member 46.

The rods 47a of the brackets 47A, 47B of the knuckle 28 are thus pivotally supported by the pistons 43 of the hydraulic actuators 41A, 41B, so that the knuckle 28 can swing about the central pivot in the central hole 25a of the holder plate 25 in response to complementarily opposite movements of the pistons 43.

It is preferable that the axes of the pistons 43 of the hydraulic actuators 41A, 41B have their extensions aligned with two tangential lines of a given circle. More specifically, such a given circle has its center located at the central pivot on the holder plate 25 which supports the swingable support shaft 28a of the knuckle 28, and passes through the two pivots about which the rods 47a of the joint brackets 47A, 47B are pivotally supported by the hydraulic actuators 41A, 41B. The lines tangential to this circle at the two pivots should be aligned with the axes of the pistons 43 of the actuators 41A, 41B for allowing the knuckle 28 to swing more smoothly.

When the knuckle 28 is caused to swing to a greater extent, the rods 47a tend to be out of alignment with the tangential lines referred to above. To allow such swinging movement of the knuckle 28, the bushing 48 in each of the joint tubular members 46 has recesses 48a defined on opposite sides of the tangential line diametrically across the rod 47a.

The hydraulic actuators 41A, 41B are identical in construction to each other, and so are the rear wheels 16RL, 16RR, which are associated with respective vehicle speed sensors 21RL, 21RR. The trailing arm 30 coupled to the rear axle beam 24 is omitted from illustration in FIG. 1.

A coil 49a is fixed to the open end of the cylinder body 42 of each of the hydraulic actuators 41A, 41B. The coil 49a and the piston 43 jointly constitute a differential transformer 49, the piston 43 serving as a moving iron. The coil 49a is electrically connected to the control unit 23 to apply a signal indicative of the operating condition of the hydraulic actuator 41 to the control unit 23.

As shown in FIG. 2, the working chambers 44 of the hydraulic actuators 41A, 41B for each of the rear wheels 16RL, 16RR are hydraulically connected to the solenoid-operated directional control valve 22 which supplies hydraulic pressure to operate the hydraulic actuators 41A, 41B. The solenoid-operated directional control valve 22 is hydraulically connected to the other outlet port of the oil pump 19 and the reservoir tank 18, and electrically connected to the control unit 23. The solenoid-operated directional control valve 22 is responsive to a signal applied from the control unit 23 for supplying hydraulic pressure to the hydraulic actuators 41 to drive the same to turn the rear wheels 16RL, 16RR, i.e., to vary the toe angle of the rear wheels 16RL, 16RR.

Figure 3:
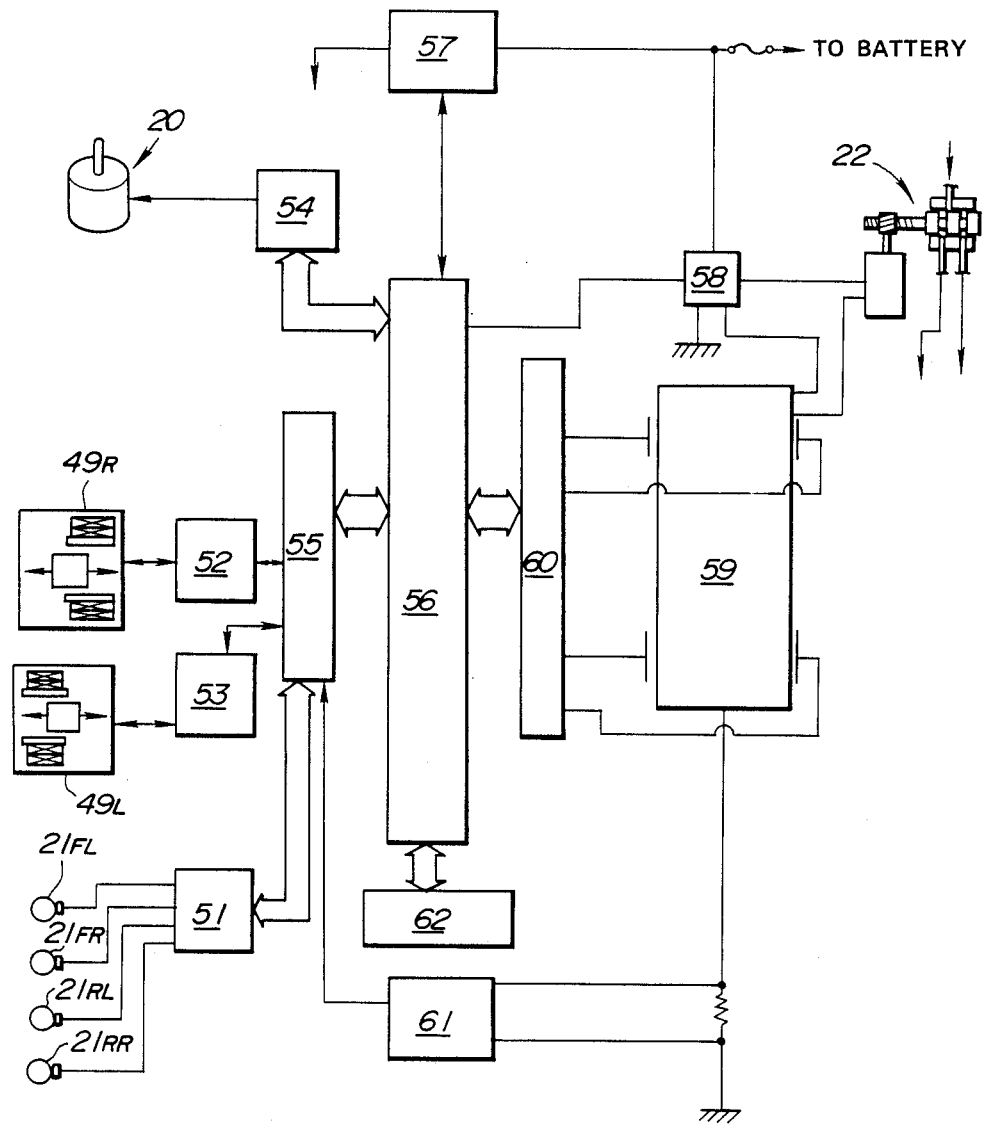
FIG. 3 is a block diagram of a control unit of the suspension.

As illustrated in FIG. 3, the control unit 23 comprises an interface circuit 51 to which the vehicle speed sensors 21FL, 21FR, 21RL, 21RR are connected, an interface circuit 52 to which the differential transformer 49R for the righthand rear wheel 16RR is connected, an interface circuit 53 to which the differential transformer 49L for the lefthand rear wheel 16RL is connected, an interface circuit 54 to which the steering angle sensor 20 is connected, an A/D converter 55 connected to the interface circuits 51, 52, 53 for converting analog signals supplied therefrom to digital signals, a central processing unit 56 connected to the A/D converter 55 and the interface circuit 54 for processing applied input signals, a memory 62 storing a control program and a data table, a constant-voltage circuit 57 for supplying constant voltage electric power to the central processing unit 56, a relay circuit 58 connected between the solenoid of the solenoid-operated directional control valve 22 and a battery and openable and closable by an output signal from the central processing unit 56, a switching circuit 59 connected between the solenoid of the solenoid-operated directional control valve 22 and ground for selectively energizing and de-energizing the solenoid, a driver circuit 60 for driving the switching circuit 59 in response to an output signal from the central processing unit 56, and a current detector 61 for detecting a current supplied to the solenoid-operated directional control valve 22 and applying a signal representing the detected current to the A/D converter 55.

The interface circuits 52, 53 connected to the differential transformers 49R, 49L, respectively, apply AC signals to the primary coils of the differential transformers 49R, 49L, rectify and smooth output signals from the secondary coils of the differential transformers 49R, 49L, and apply analog signals of opposite characteristics to the A/D converter 55. The central processing unit 56 processes the output signals from the sensors 20, 21FL, 21FR, 21RL, 21RR, the differential transformers 49R, 49L, and the current detector 61 to drive the relay circuit 58 and the driver circuit 60 according to the control program stored in the memory 62. In this embodiment, the solenoid of the solenoid-operated directional control valve 22 is supplied with a periodically interrupted current for chopper control, and the central processing unit 56 supplies the driver circuit 60 with a signal indicative of the duty factor of the periodically interrupted current applied to the solenoid of the solenoid-operated directional control valve 22.

Operation of the suspension according to the above embodiment will be described below.

Figure 4:
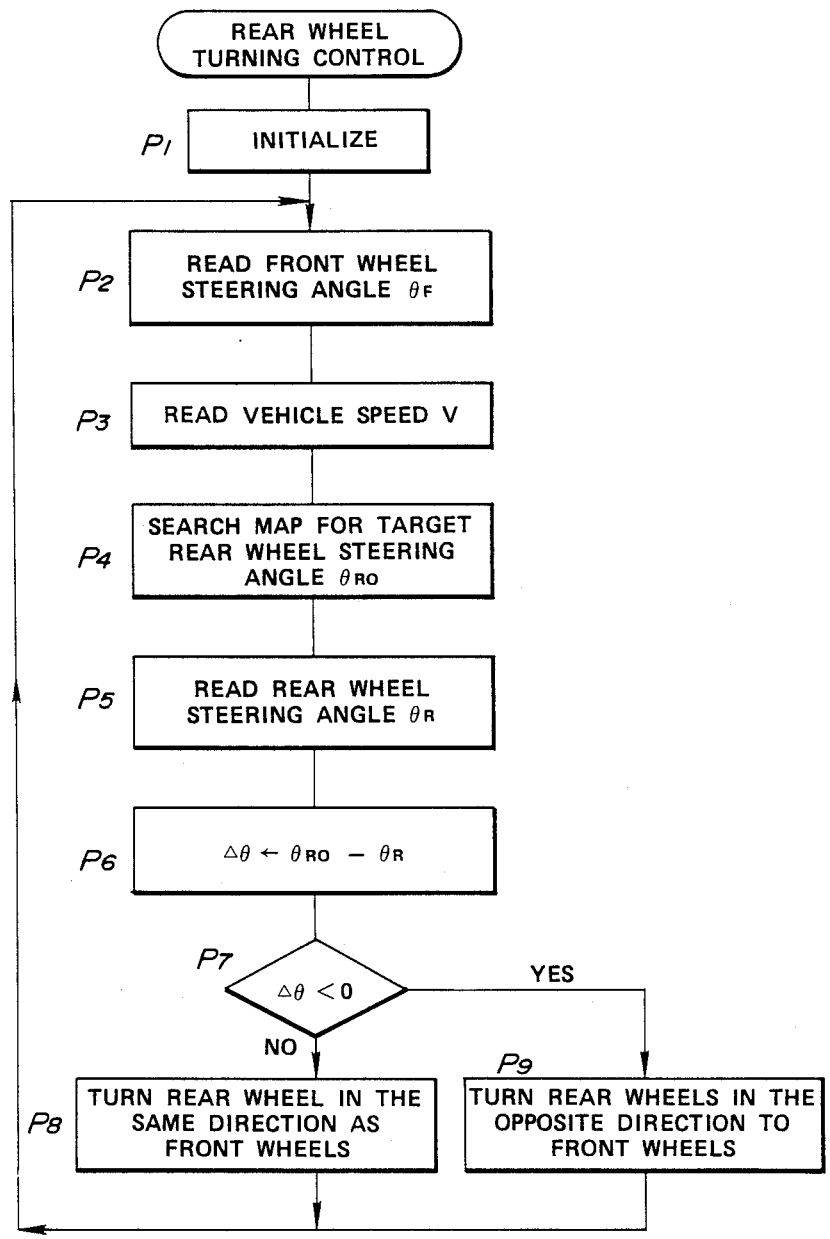
FIG. 4 is a flowchart of a control sequence of the suspension.

In the automobile equipped with the suspension of the invention, the central processing unit 56 executes the control sequence of the flowchart shown in FIG. 4 to control the hydraulic actuators 41 for thereby turning the rear wheels 16RL, 16RR, i.e., adjusting the toe angle thereof.

Stored data in a RAM in the memory 62 are erased and the memory 62 is addressed for initialization in a step P1. Then, the steering angle $\theta F$ of the front wheels 16FL, 16FR is read from the output signal of the steering angle sensor 20 in a step P2, and then the vehicle speed V is read from the output signals of the vehicle speed sensors 21FL, 21FR, 21RL, 21RR in a step P3. Thereafter, the data table or map stored in the ROM is searched for a target rear wheel steering angle $\theta RO$ based on the steering angle $\theta F$ of the front wheels 16FL, 16FR in a step P4. In the step P4, the target rear wheel steering angle $\theta RO$ is determined such that the side slip angle of the vehicle body will be zero based on the following equation:

$$k = \frac{A - Bu^2}{B - Du^2}$$

where k is the ratio between the steering angles of the front and rear wheels, u is the vehicle speed, and A, B, C, D are constants.

Then, the steering angle $\theta R$ of the rear wheels 16RL, 16RR is read from the output signals of the differential transformers 49R, 49L in a step P5. A next step P6 calculates the difference $\Delta\theta$ between the steering angle $\theta R$ of the rear wheels 16RL, 16RR and the target rear wheel steering angle $\theta RO$ ($\Delta\theta = \theta RO - \theta R$). Thereafter, a step P7 ascertains whether the difference $\Delta\theta$ is positive or negative. If the difference $\Delta\theta$ is positive or zero, a step P8 is executed, and if the difference $\Delta\theta$ is negative, a step P9 is executed. In the step P8, the actuators 41a, 41b are operated to turn the rear wheels 16RL, 16RR in the same direction as the front wheels 16FL, 16FR up to the target rear wheel steering angle $\theta RO$. In the step P9, the actuators 41a, 41b are driven to turn the rear wheels 16RL, 16RR in the opposite direction to the front wheels 16FL, 16FR up to the target rear wheel steering angle $\theta RO$.

In the suspension of the above embodiment, the holder plate 25 is fixed to the rear axle beam 24, the knuckle 28 is coupled to the holder plate 25 by the joint 27, and the actuators 41A, 41B are disposed between the knuckle 28 and the holder plate 25. Therefore, no additional links are required, the number of components used is small, and the structure is simple. With no additional links used, the suspension geometry can be determined with great freedom and the suspension can be designed with ease.

The suspension can be used with both steering and nonsteering arrangements simply by selectively attaching and detaching the holder plate 25. Therefore, when using the suspension with a different automobile arrangement, it is not necessary to modify suspension members and supports on the vehicle body for such suspension members. The suspension of the invention is thus compatible and versatile.

In the above illustrated embodiment, the rear wheels are turned, or the toe angle thereof is adjusted in the same direction or in phase. However, the rear wheels may be turned for toe-in or toe-out, or the toe angles of the rear wheels may independently be adjusted by altering the control program stored in the central processing unit 56 and the memory 62.

Figure 5:
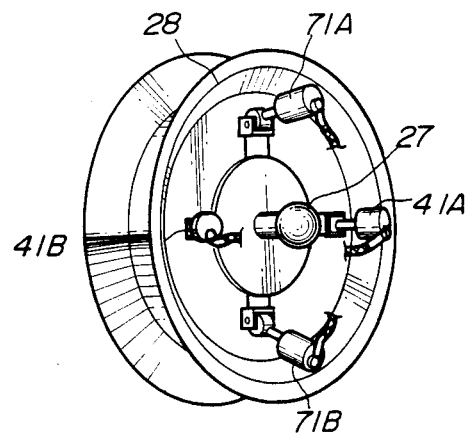
FIG. 5 is a perspective view of an automobile suspension according to a second embodiment of the present invention.
Figure 6:
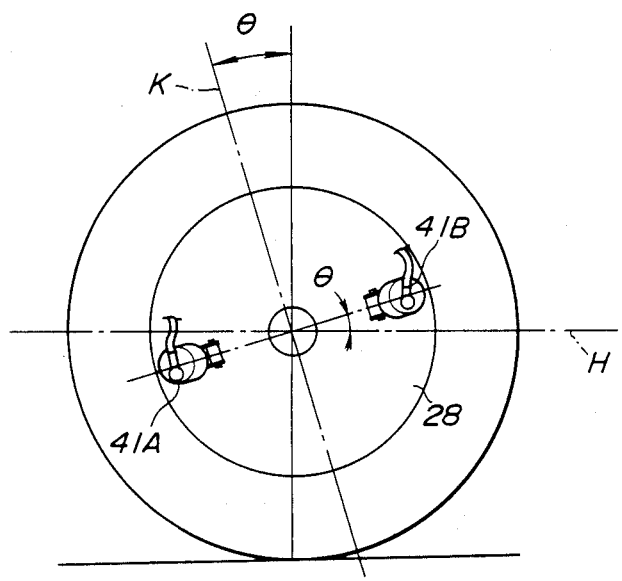
FIG. 6 is a side elevational view of an automobile suspension according to a third embodiment of the present invention.

FIGS. 5 and 6 show suspensions according to second and third embodiments, respectively, of the present invention.

The suspension shown in FIG. 5 includes, in addition to the toe-angle adjusting actuators 41A, 41B, a pair of camber-angle adjusting actuators 71A, 71B disposed in upper and lower positions, respectively, on a line passing through the central pivot for the knuckle and normal to the array line for the actuators 41A, 41B. According to this suspension, the rear wheels can be turned or the toe angle thereof can be adjusted by operating the actuators 41A, 41B, and the camber angle can be adjusted by driving the actuators 71A, 71B. Therefore, the suspension characteristics can be controlled more freely for better steering stability.

In the suspension illustrated in FIG. 6, the actuators 41A, 41B are disposed symmetrically with respect to a kingpin axis k tilted at a caster angle 0 to a line normal to the longitudinal direction of the automobile, i.e., a horizontal line H. With this suspension, the force of recovery of the wheel when turning back to its straight position can be varied by selecting the caster angle, and the camber angle and the toe-in or -out can be controlled by the pair of actuators 41A, 41B.

While the present invention has been described as being applied to the suspension for a rear wheel, The suspension of the present invention may be associated with a front wheel.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. An automobile suspension comprising:
   a suspension member coupled to a vehicle body;
   a disc-shaped actuator mechanism detachably supported on said suspension member and disposed adjacent a rotatable wheel;
   a knuckle having a swingable support shaft swingably supported for swinging movement about a central pivot through which the axis of said disc-shaped actuator mechanism passes, said knuckle being adapted to support said wheel rotatably; and
   said disc-shaped actuator mechanism including a pair of actuator means disposed thereon at respective positions spaced substantially equally from the central pivot and located on at least one straight line passing through said central pivot, said actuator means pivotally supporting said knuckle, respectively, for causing said knuckle to be angularly moved about said central pivot.

2. An automobile suspension according to claim 1, wherein said knuckle is pivotally supported on said pair of actuator means for swinging movement about a pair of bushings each made of an elastomeric material.

3. An automobile suspension according to claim 1, wherein said actuator means comprises a pair of hydraulic actuators, respectively, including respective cylinder bodies and respective pistons slidably disposed therein, said pistons having respective axes aligned with respective lines tangential to a circle having its center at said central pivot and passing through two points where said knuckle is pivotally supported by said actuator means, said lines being tangential to said circle at said two points, respectively.

4. An automobile suspension according to claim 3, wherein said hydraulic actuators have joint tubular members, respectively, coupled to said pistons and including elastomeric bushings, respectively, said joint tubular members having axes normal to said circle, said knuckle having a pair of joint brackets having respective rods inserted through said elastomeric bushing coaxially with said joint tubular members.

5. An automobile suspension according to claim 4, wherein each of said elastomeric bushings has a pair of cavities defined therein one on each side of the axis of the piston diametrically across said rod.

6. An automobile suspension according to claim 1, wherein each of said actuator mechanisms has a holder plate on which said swingable support shaft of said knuckle is swingably supported by a ball joint, said holder plate being detachably mounted on said suspension member through bolts.

7. An automobile suspension according to claim 6, further including a hub connected to a brake disc and a wheel, said hub being rotatably supported on said knuckle.

8. An automobile suspension according to claim 1, wherein said pair of actuator means is disposed on said straight line which extends parallel to a road surface.

9. An automobile suspension according to claim 8, wherein said disc-shaped actuator mechanism further includes another pair of actuator means disposed on a straight line passing through said central pivot and normal to said first-mentioned straight line.

10. An automobile suspension according to claim 1, wherein said pair of actuator means is disposed on a line tilted a given angle with respect to line parallel to a road surface.

11. An automobile suspension comprising:
    a rear axle beam supported on a rear portion of a vehicle body by at least trailing arms and spring suspension means;
    a disc-shaped actuator mechanism detachably supported respectively on each of opposite ends of said rear axle beam;
    a knuckle having a swingable support shaft swingably supported for swinging movement about a central pivot through which the axis of said disc-shaped actuator mechanism passes, said knuckle being adapted to support a wheel rotatably;
    said disc-shaped actuator mechanism including a pair of hydraulic actuators disposed thereon at respective positions spaced substantially equally from the central pivot and located on at least one straight line passing through said central pivot, said hydraulic actuators pivotally supporting said knuckle;
    a sensor mechanism for detecting at least a vehicle speed and the steering angle of a steerable wheel;
    a control unit for producing a control signal in response to an output signal from said sensor mechanism; and
    a hydraulic pressure supply mechanism responsive to the control signal from said control unit for supplying controlled hydraulic pressure to said hydraulic actuators to enable the hydraulic actuators to move in complementarily opposite strokes for angularly moving said knuckle.

12. An automobile suspension according to claim 11, wherein said pair of hydraulic actuators is disposed on said straight line which extends parallel to a road surface.

13. An automobile suspension according to claim 12, wherein said disc-shaped actuator mechanism further includes another pair of hydraulic actuators disposed on a straight line passing through said central pivot and normal to said first-mentioned straight line.

14. An automobile suspension according to claim 11, wherein said pair of hydraulic actuators is disposed on a line tilted a given angle with respect to line parallel to a road surface.

* * * * *